United States Patent
Norman

[11] 3,975,080
[45] Aug. 17, 1976

[54] PORTABLE HOLOGRAPHIC INFORMATION RETRIEVAL SYSTEM WITH AN ACTIVE SCREEN

[75] Inventor: Scott L. Norman, Framingham, Mass.

[73] Assignee: GTE Laboratories Incorporated, Waltham, Mass.

[22] Filed: Mar. 27, 1975

[21] Appl. No.: 562,720

[52] U.S. Cl.............................. 350/3.5; 350/160 LC; 353/74
[51] Int. Cl.²...................... G03H 1/30; G03H 1/22
[58] Field of Search...................... 350/3.5, 160 LC; 353/74–79, 119

[56] References Cited
UNITED STATES PATENTS

| | | | |
|---|---|---|---|
| 3,234,848 | 2/1966 | Stoothoff | 353/77 |
| 3,592,527 | 7/1971 | Conners | 350/160 LC |
| 3,612,640 | 10/1971 | Kogelnik | 350/3.5 |
| 3,619,026 | 11/1971 | Cindrich | 350/3.5 |
| 3,675,983 | 7/1972 | LaMacchia | 350/3.5 |
| 3,870,411 | 3/1975 | Schwartz et al. | 353/78 |

OTHER PUBLICATIONS
Gamblin, IBM Technical Disclosure Bulletin, vol. 11, No. 11, Apr., 1969, pp. 1392–1393.

*Primary Examiner*—Ronald J. Stern
*Attorney, Agent, or Firm*—Irving M. Kriegsman; Bernard L. Sweeney; Robert A. Seldon

[57] ABSTRACT

A portable holographic information retrieval system is described in which individual holograms each of which contains the alphanumeric information from an individual page of a book, are reconstructed on a rear-illuminated viewing screen. The individual holograms are contained on a permanent transparency as a matrix, the holograms of successive pages of a book being arranged in a sequential manner. The entire matrix of individual page holograms is contained on a transparency which is approximately equal in size to a standard 35 millimeter photographic slide. The reconstruction apparatus has the rear-illuminated viewing screen collapsibly mounted to a system housing. The housing includes a small source of a collimated beam of light for illuminating a selected "page" in the transparency. The transparency is mounted on a carriage which is capable of being traversed relative to the illuminating collimated beam of light so that an individual page hologram may be reconstructed by having a real image formed on the viewing screen. When collapsed for storage, the portable retrieval system is approximately the size of a standard volume.

5 Claims, 6 Drawing Figures

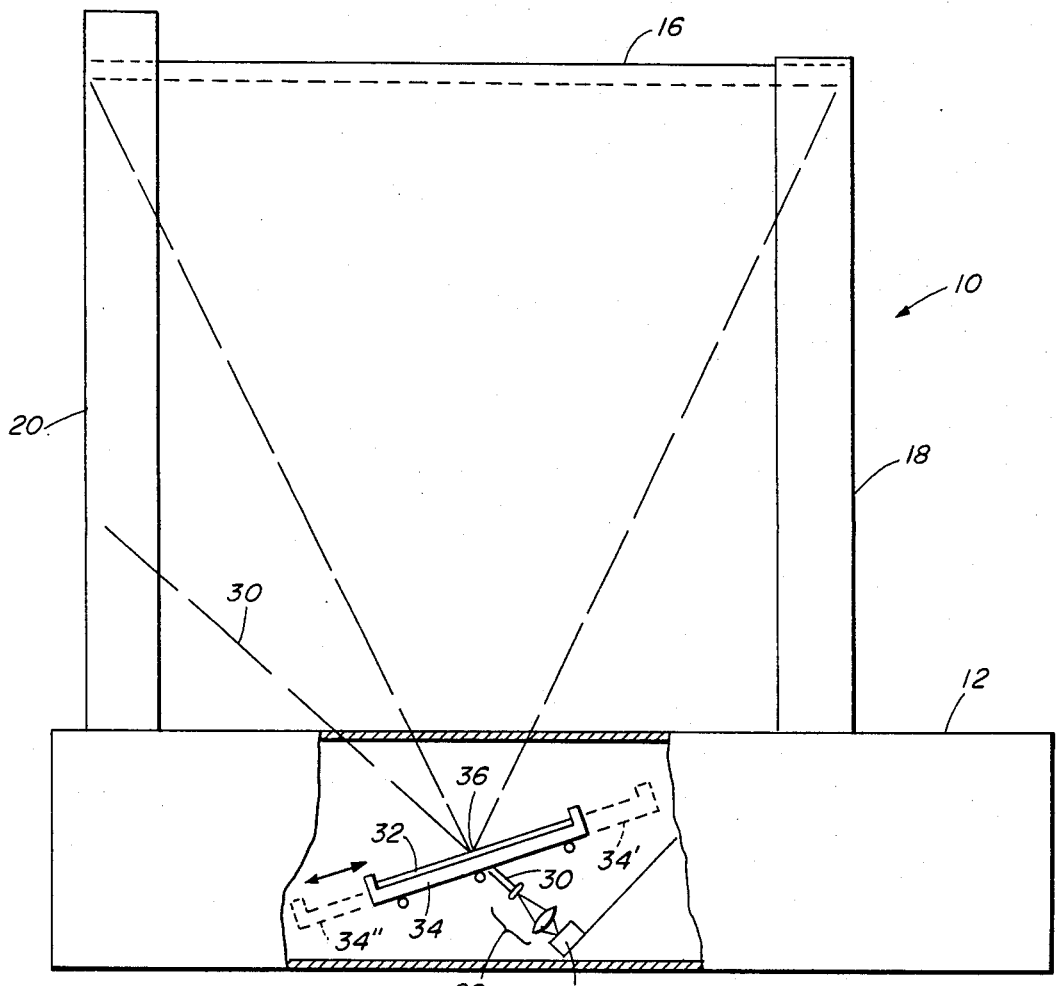
FIG. 2
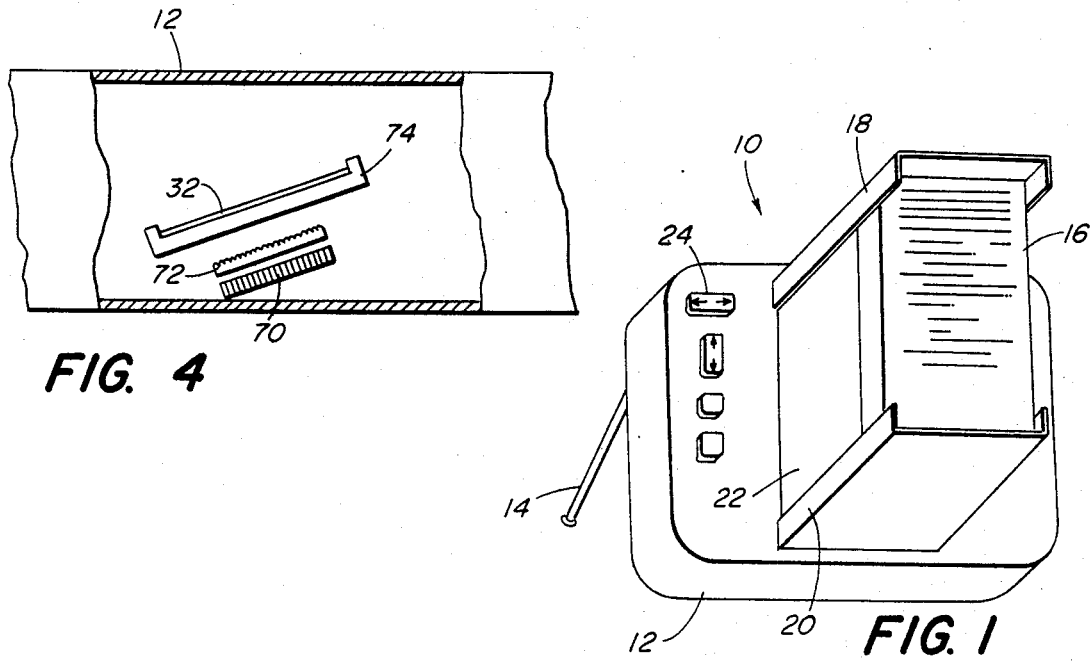
FIG. 4
FIG. 1

3,975,080

PORTABLE HOLOGRAPHIC INFORMATION RETRIEVAL SYSTEM WITH AN ACTIVE SCREEN

BACKGROUND OF THE INVENTION

This invention is related generally to holographic information retrieval systems and is more particularly concerned with a novel system which is portable and which is intended for the retrieval of textual information by individuals.

With the burgeoning volume of textual material, both fictional and non-fictional, in recent years, a number of interrelated problems have been presented for which solutions have yet to be found. Foremost among the problems being considered is the volume of space required in which to store the material which is being generated. Libraries of all types are finding themselves unable to keep pace in the expansion of their physical facilities relative to the required volume of space.

With the recent expansion of awareness of the resources depletion both in this country and worldwide, major efforts are underway in a diverse number of areas in attempts to control the depletion of those resources. Paper is a prominent area of effort. The volume of paper utilized in publishing industry for publication of textual materials is tremendously large.

As a result of these problems, efforts are underway in attempts to solve those problems. However, these studies are directed primarily toward large volume alphanumeric data storage and retrieval systems. That is, they are oriented towards the storage and retrieval of information on a large scale such as is necessary in technical libraries. Individually oriented systems for storage and retrieval of alphanumeric data have not received significant study.

Holograms are particularly susceptible to use in such information retrieval systems because the inherent redundancy which exists in the holograms permits high storage densities to be achieved. Each point in the hologram contains information about all points in the object; therefore, a scratch or imperfection in the hologram serves only to reduce resolution, not obliterate a portion of the image as occurs in photographically recorded images.

SUMMARY OF THE INVENTION

It is, therefore, an object of the present invention to provide a novel apparatus for retrieving alphanumeric data which is stored holographically.

It is a second object of the invention to provide such apparatus which is portable in nature and oriented toward use by an individual.

It is another object of the invention to provide such an apparatus which is simple to use and which accepts the holographically stored alphanumeric information in a convenient readily reproducible form.

Briefly, the invention in its broadest aspect comprises a portable holographic information retrieval system. The system includes a system support apparatus, a rear-illuminated viewing screen and a collapsible viewing screen carrier which is affixed to the system support and the rear-illuminated viewing screen. The carrier defines two relative positions for the viewing screen and the system support. In a first such position, the viewing screen is collapsed toward the system support for storage, whereas in the second position, the viewing screen is extended from the system support and is in position for ready viewing by a user. A permanent transparency contains a matrix of individual holograms. Each such individual hologram contains the information from an individual page of a book. The holograms of successive pages of the book are arranged in a sequential manner in the matrix of holograms. The transparency is disposed in and attached to the system support, when the viewing screen is in the second position, at an optical distance from the rear of the viewing screen such that a real image of the page is formed on the rear of the viewing screen, the individual holograms having been formed by intersecting a reference beam and an information containing data beam at the transparency. A source of a generally collimated beam of light is affixed within the system support such that at an individual hologram the generally collimated beam of light from the source is conjugate to the reference beam used to form the individual hologram. A real image of the page contained within that individual hologram is then formed on the rear of the viewing screen whereby the user may read the page by looking at the front of the viewing screen. Finally, means are provided for traversing the transparency relative to the generally collimated beam of light so that a selected individual hologram may be reconstructed.

Further objects, advantages and features of the invention will be apparent from the following detailed description of the preferred embodiments taken together with the accompanying drawing.

BRIEF DESCRIPTION OF THE DRAWINGS

In the Drawing:

FIG. 1 is an isometric view of a typical portable holographic information retrieval system according to the present invention, the system being shown in its operational position;

FIG. 2 is an enlarged side elevation view, shown partially schematically and partially in section, of the portable holographic information retrieval system shown in FIG. 1;

FIG. 4 is a partial side elevation view of an alternative means of providing a collimated beam of light for reconstructing the individual holograms.

DETAILED DESCRIPTION OF THE PREFERRED EMBODIMENTS

Figure 3A:
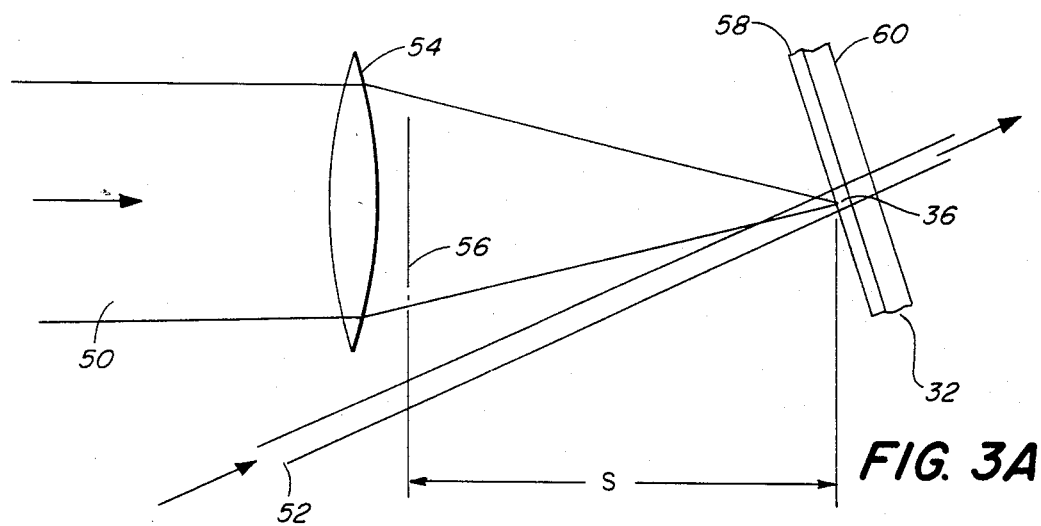
FIGS. 3A and 3B are schematic optical diagrams which are useful for illustrating Fourier transform hologram geometry.

In referring to the several figures of the drawing hereinbelow, like reference numerals will be utilized to refer to identical parts of the apparatus.

Referring initially to FIG. 1 of the drawing, there is shown a portable holographic information retrieval system according to the present invention which is designated generally by the reference numeral 10. The system 10 includes a system support 12 which may be, as shown in FIG. 1, a generally enclosed housing having a means 14 such as a set of collapsible legs for supporting the housing 12 in a convenient viewing position on a surface such as a table top. A viewing screen 16 is shown in an extended position from the housing 12 and supported in a collapsible viewing screen carrier. The carrier is generally formed of a pair of opposed channel members 18 and 20 which are hingedly attached to the housing 12 and a pair of optional side screens 22. A set of viewer controls 24 is included on the front panel of the housing 12 in order to allow a user to operate the system 10.

The collapsible viewing screen carrier defines a pair of positions for the viewing screen 16 relative to the support 12. The extended or operating position is shown in FIG. 1. The other position is a storage or carrying position and there the carrier and the viewing screen are collapsed against and into the housing 12. In this manner, the housing 12 can have a form factor which is relatively similar to that of a conventional textual volume thereby rendering it capable of convenient portable usage.

The viewing screen 16 is rotatably attached at its upper edge within the upper channel member 18. When it is desired to store the system 10, the viewing screen 16 is disengaged from a detent in the lower channel member 20 and is swung upwardly into a second detent position within the upper channel member 18. The upper channel member 18 is then rotated down and into the housing 12 thereby covering and protecting the viewing screen 16. Finally, the lower channel member 20 is rotated inwardly on top of the upper channel member 18 so as to provide additional protection and support for the viewing screen in the collapsed storage position. The side screens 22 which are provided in a preferred embodiment for the purpose of restricting the amount of ambient light incident on the rear of the viewing screen and to block the reconstruction laser beam from escape are pliable and collapse readily into the apparatus during the disposal of the carrier and screen. Other collapsing arrangements for the carrier, such as a flip-out hood similar to those utilized for waist level view finders of reflex cameras are also included within the purview of the invention. Also various bellows arrangements can be used effectively.

Referring now to FIG. 2 of the drawing, an enlarged side elevation view is shown with the side screen 22 removed. A small light source 26, such as a diode laser or high radiance light emitting diode, is attached to the support housing 12 and is positioned to emit a beam of energy which is collimated, if necessary, by a telescope 28 to provide a reconstruction beam 30 which intersects a transparency 32 at an angle which is conjugate to the angle at which a reference beam intersected the transparency at the time the hologram was formed. In this manner, the data beam is reconstructed by diffraction of the reconstruction beam at the hologram and an image of the page is formed on the rear of the screen 16. The cross-sectional size of the reconstruction beam 30 is a function of the size of the individual page hologram located on the transparency 32. The transparency 32 is mounted on a translator 34 which is capable of moving the transparency relative to the collimated reconstruction beam 30 so as to bring the desired individual page hologram within the reconstruction beam so that its image may be formed on the screen 16. The remote positions of the translator 34 are shown in dotted lines by the reference numerals 34' and 34''. Also electrochemical cells may be included in the housing 12 to provide completely portable capability to the system 10.

Although the arrangement of FIG. 2 shows the reconstructed data beam projected directly onto the rear of the viewing screen 16, it is intended that in some constructions of the invention that mirrors may be incorporated to fold the reconstructed data prior to it reaching the viewing screen 16.

Figure 3B:
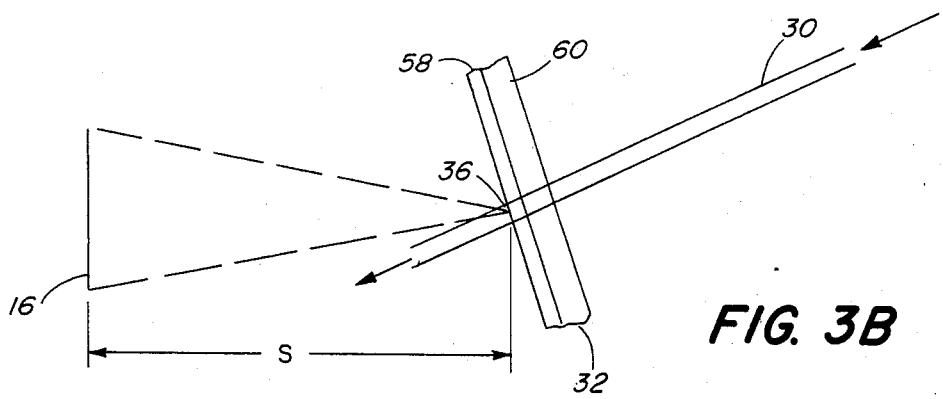

Turning to FIGS. 3A and 3B of the drawing, there is shown, in schematic form, an exemplary system of components and their relative orientations which are useful for the formation and reconstruction of the individual page holograms in the preferred embodiment of the transparency 32. The holograms are formed by intersecting a data beam 50 and a reference beam 52 which have been derived from the same laser source at a small area 36 on the transparency 32. The data beam 50 is is focussed by a lens 54 to the spot size 36. The size of the spot 36 determines the size of the hologram which is formed in the transparency. A transparency 56 of the page of textual information to be stored in the hologram in the spot 36 is emplaced between the lens 54 and the transparency 32 at a distance S from the spot 36. The input transparency is essentially a full size transparency containing in normal print and figures the information on the page of the book. When the data and reference beams 50 and 52 interesect at the spot 36 an interference pattern is formed and recorded at that point. For present purposes, a recording medium 58 and a substrate layer 60 are combined in the transparency 32 to form a structurally stable transparency system. This feature is necessary in order that a transparency after processing can be accurately positioned within the retrieval apparatus.

FIG. 3B shows the reconstruction of an image from a hologram formed at a spot 36 in the recording medium 58. A collimated reconstruction beam 30 is passed through the transparency 32 at the spot 36 from a direction which is conjugate to the original reference beam 52 utilized in formation of the hologram. The data beam is then reconstructed and forms a real image at a distance S from the point 36. The image formed at the distance S is of unity magnification with the input transparency 56 utilized in forming the hologram.

This is a convenient way to redundantly record a two dimensional irradiance distribution and is known as a Fourier transform hologram. This technique makes use of the fact that under certain conditions, the electric field amplitudes in the front and back focal planes of a lens are Fourier transforms of each other, i.e., information about light intensity at one point in the object is translated into information about the intensity of a Fourier component of a particular spatial frequency in the diffraction pattern. This is just the kind of one to many mapping which is required for redundant storage.

The holographic formation and reconstruction system shown in FIGS. 3A and 3B is exemplary in nature and may be modified in several ways without departing from the invention. For example, if the intersection of the data beam 50 and the reference beam 52 is slightly displaced from the recording medium 58, i.e., the system is defocussed slightly, the constraints on the coherence of the reconstruction source can be somewhat relaxed. This allows the use of a high radiance light emitting diode or a less sophisticated laser as the source of light for the reconstruction beam while maintaining an acceptable image on the viewing screen. Such defocussing may require the introduction of an additional optical element between the transparency 32 and the viewing screen 16 during reconstruction and its incorporation is also contemplated at this time.

FIGS. 3A and 3B shows the reference and reconstruction beams 52 and 30 as being highly collimated. This is not necessary in many constructions. What is required is that if the reference beam 52 is slightly converging that the reconstruction beam 30 be diverging by approximately an equal amount provided that the reference and reconstruction beams are of generally the same wavelength. However, as is likely to be true, the reference beam 52 and the reconstruction beam 30 may have quite different wavelengths. Here the angles of convergence and divergence are different; however, the angles are interrelated and may be established by techniques which are well known in the art. Therefore, the term conjugate herein has both direction and convergence/divergence significance. The use of different wavelengths also causes changes in magnification between the input transparency and the image.

While the foregoing discussion has centered on the specific recording arrangement shown in FIG. 3A, any other means by which such a transparency 32 can be formed is within the broad aspects of the invention. For example, the input transparency may be located at any point within one focal length on either side of the lens 54; however, such other locations generally require additional optical elements in the reconstructed data beam. Also, the data beam 50 may be modulated by an electro-optic device rather than by a transparency.

Although standard photographic type techniques may be utilized for forming holograms in the transparencies, it is preferable that the transparencies be formed of a thermally stable layer 60 with a layer of vinyl or other material into which a surface relief holographic pattern may be embossed. Such surface relief holograms are known in the art and this process lends itself readily to mass reproduction techniques which could considerably lower the cost of reproducing large volumes of material. This is particularly true for those volumes in which only a few copies are sold within a given period. It is not necessary to set up a complete press run in order to derive the requisite number of copies of the work. A simple master may be emplaced in the manufacturing process and the requisite number of copies produced at substantially no increase in cost.

This technique together with a portable viewer would be especially advantageous to a student who is now normally required to carry a large number of volumes of material with him at a time. A student would simply carry a portable viewer together with a number of transparencies which could easily emcompass all of the material for which he is responsible in a year. All of his apparatus and materials will only total to the volume and weight of a single standard textbook.

The translator 34 in FIG. 2 is preferably a small motorized x-y carriage which moves within its own plane above the collimated reconstruction light source in the housing 12. However, it is also within the purview of the invention that such a translator may be mechanically mobile through the use of a "joy stick" linkage arrangement. With sufficient mechanical advantage in the level orienting of individual holographic images on the screen 16 should be no problem to an ordinary user. Another arrangement which may be used is a combination including a ratchet and a solenoid.

FIG. 4 shows an alternative arrangement for a source of a collimated beam of light for the reconstruction beam 30. A linear array 70 of light emitting diodes is placed within the housing 12 and has associated therewith an array 72 of a like number of collimating lenses. Therefore, there is an individual collimating lens in the array 72 which corresponds to each light emitting diode in the array 70. When arranged in this manner, the array of LED sources is disposed in the viewer housing 12 so that the array is capable of illuminating a single row of individual page holograms. The translator 74 now is only required to move a single direction rather than two. This arrangement is somewhat less desirable than the arrangement shown in FIG. 1 since each row of page holograms now must be recorded from a slightly different subject beam angle for all reconstructed images to fall at the same position on the viewing screen 16. However, this is well within the capabilities in the art and when the recording is being done on a large scale it would have little effect on the cost of such transparencies. A means is now also included for selectively energizing a single light emitting diode from the array. The diode selected is associated with a page in the matrix.

Although the viewing screen 16 may be a passive structure such as a ground glass screen, such passive systems are inherently plagued with problems of insufficient intensity and contrast, particularly in high ambient light environments. Passive viewing screen systems may require such refinements as directional scattering surfaces or Fresnel lenses and the inclusion of these refinements is included in the invention. Furthermore, a simple passive screen generates images in other than the conventional black and white found in most books. In addition, the laser source 26 may be one which operates in other than the visible portion of the electromagnetic spectrum, such as gallium arsenide diode laser.

Figure 5:
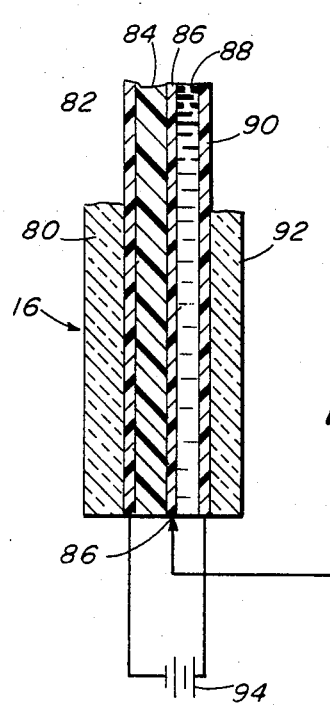
FIG. 5 is a partial sectional view which is partially in schematic form of a preferred construction for the viewing screen.

As a result of these problems, it is preferably preferable that the viewing screen 16 be an active, spectrally sensitized system, such as that shown in FIG. 5. Starting from the photoreceptive side of the active screen 16, a first sheet of glass 80 is included which is transparent to the incoming light energy and which serves to protect the liquid crystal sandwich. A first transparent electrode 82 and a photoconductor 84 are located serially from the glass 80. The photoconductive layer 84 may be, for example, either selinium or cadmium sulfide, or tin-oxide. An opaque, reflective or absorbant layer 86 is interposed in the middle of the sandwich to prevent the light incident on the glass 80 from passing through the sandwich. A nematic liquid crystal layer 88 is followed by a second transparent electrode 90 and a final sheet of glass 92 to complete the liquid crystal screen sandwich.

In operation, an image light falls on the photoconductor-liquid crystal cell, which is biased with a DC voltage. The voltage is arranged so that when no image is present, most of the voltage appears across the photoconductor and the voltage across the liquid crystal stays below the switching threshold. However, when an image is present, the photoconductor permits current to flow through the liquid crystal, creating dynamic scattering at the conduction points. In general, the dynamic scattering gives a milky appearance to otherwise transparent nematic material. If the membrane separating the photoconductor and the liquid crystal are flat black, white letters are generated on a black background. In this instance, the original hologram should be recorded from a negative having transparent letters on an opaque background for reasons of efficiency and signal to noise ratio. A viewing screen of this sort depends upon ambient light levels for viewing just like the printed page. Similarly, its contrast also increases with the ambient light level. Therefore, this is a far more desirable type of screen for use in a holographic information retrieval system.

If negative page images are unacceptable to the user, it is possible to use other electrooptic effects in liquid crystals, such as a field induced phase change from cholestric to oriented nematic to generate dark letters on a light background.

A similar viewing screen structure which offers high inherent contrast and dependence on ambient lighting conditions is an electrophoretic image display. In this display, the nematic liquid crystal layer 88 in FIG. 5 is replaced by a liquid having a large number of particles therein. The liquid is of a first color and the particles are of another contrasting color. When a variable electric field is applied across the liquid layer as by the mechanism of FIG. 5, the colored particles are either attracted to or repelled from the second transparent electrode 90. The result is that an image is formed which is defined by the pattern in which the particles are attracted to the second electrode, the contrasting color liquid being visible elsewhere.

This type of active screen is highly preferable because the colors of print and background are selectable at will and may be reversed within a given screen by reversing the polarity of the initial DC voltage level.

While there have been shown and described what are considered to be the preferred embodiments of the present invention, it will be obvious to those of ordinary skill in the art that various changes and modifications may be made therein without departing from the spirit of the invention as defined by the appended claims.

I claim:

1. An individual-oriented portable book-like holographic viewer for the display of textual information comprising:
    a generally enclosed housing having a size approximating a conventional textual volume,
    a rear-illuminated active viewing screen;
    a collapsible viewing screen carrier affixed to the housing and the rear-illuminated viewing screen, the carrier defining two relative positions for the viewing screen and the housing in the first such position the viewing screen being collapsed toward the housing for storage, and in the second position the viewing screen being extended from the housing and in position for ready viewing by the individual, the viewer being of an approximate size of a conventional book when the screen is in the first position;
    a permanent transparency containing a matrix of individual holograms, each such individual hologram containing substantially all the information from an individual page of a book, holograms of successive pages of the book being arranged in a sequential manner in the matrix of holograms, the transparency being disposed in and attached to the housing at an optical distance from the rear of the viewing screen when the viewing screen is in the second position such that a real image of the page is formed on the rear of the viewing screen, the individual holograms having been formed by intersecting a reference beam and a data beam at the transparency,
    a source of generally collimated beam of light being affixed within the housing so that at an individual hologram the generally collimated beam of light is conjugate to the reference beam used to form the individual hologram, a real image of the page being formed on the rear of the viewing screen whereby the individual may read the page by looking at the viewing screen, and
    means for traversing the transparency relative to the generally collimated beam of light so that a selected individual hologram may be reconstructed.

2. The viewer of claim 1 wherein the holograms are surface relief holograms.

3. A portable holographic information retrieval system according to claim 2 wherein the individual holograms are Fourier transform holograms.

4. A portable holographic information retrieval system according to claim 1 wherein the means for traversing the transparency includes a carriage mounted in the housing and which is traversable in a plane generally parallel to the transparency.

5. A portable holographic information retrieval system according to claim 1 wherein the viewer further includes an electrochemical power cell for powering the system in a portable manner.

* * * * *

UNITED STATES PATENT OFFICE
CERTIFICATE OF CORRECTION

Patent No. 3,975,080  Dated August 17, 1976

Inventor(s) Scott L. Norman

It is certified that error appears in the above-identified patent and that said Letters Patent are hereby corrected as shown below:

Column 6, line 30, delete "preferably".

Signed and Sealed this

Ninth Day of November 1976

[SEAL]

Attest:

RUTH C. MASON
Attesting Officer

C. MARSHALL DANN
Commissioner of Patents and Trademarks